US011711715B2

(12) United States Patent
Jung et al.

(10) Patent No.: US 11,711,715 B2
(45) Date of Patent: *Jul. 25, 2023

(54) MEASUREMENT REPORTING METHOD OF TERMINAL AND TERMINAL USING SAME

(71) Applicant: LG Electronics Inc., Seoul (KR)

(72) Inventors: Sunghoon Jung, Seoul (KR); Youngdae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/858,438

(22) Filed: Jul. 6, 2022

(65) Prior Publication Data
US 2022/0353723 A1 Nov. 3, 2022

Related U.S. Application Data

(63) Continuation of application No. 16/867,185, filed on May 5, 2020, now Pat. No. 11,405,810, which is a
(Continued)

(51) Int. Cl.
*H04W 24/10* (2009.01)
*H04W 76/19* (2018.01)
(Continued)

(52) U.S. Cl.
CPC .......... *H04W 24/10* (2013.01); *H04L 5/0032* (2013.01); *H04W 24/02* (2013.01);
(Continued)

(58) Field of Classification Search
CPC ..... H04W 24/10; H04W 76/19; H04W 24/02; H04W 72/085; H04W 76/15; H04W 88/02; H04L 5/0032; Y02D 30/70
See application file for complete search history.

(56) References Cited

U.S. PATENT DOCUMENTS

2010/0197300 A1  8/2010  Van Der Velde et al.
2011/0319028 A1  12/2011  Magadi Rangaiah et al.
(Continued)

FOREIGN PATENT DOCUMENTS

CN  102215526  10/2011
CN  102378287  3/2012
(Continued)

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 10)," 3GPP Ts 36.331, V10.11.0, Sep. 2013, pp. 1-308.
(Continued)

*Primary Examiner* — Mazda Sabouri
(74) *Attorney, Agent, or Firm* — Fish & Richardson P.C.

(57) ABSTRACT

Provided are a measurement reporting method of a terminal in which a primary cell is set and a terminal apparatus using the measurement reporting method. The method comprises: a step for adding a secondary cell; a step for determining whether the secondary cell is applicable to related measurement; and a step for determining whether the secondary cell is included in a cellsTriggeredList, wherein when the secondary cell is not applicable to the related measurement and the secondary cell is included in the cellsTriggeredList, the secondary cell is removed from the cellsTriggeredList.

17 Claims, 17 Drawing Sheets

Related U.S. Application Data continuation of application No. 15/023,082, filed as application No. PCT/KR2014/008749 on Sep. 19, 2014, now Pat. No. 10,659,984.

(60) Provisional application No. 61/880,795, filed on Sep. 20, 2013.

(51) Int. Cl.
    *H04W 72/542*     (2023.01)
    *H04L 5/00*     (2006.01)
    *H04W 24/02*     (2009.01)
    *H04W 76/15*     (2018.01)

(52) U.S. Cl.
    CPC ......... *H04W 72/542* (2023.01); *H04W 76/19* (2018.02); *H04W 76/15* (2018.02); *Y02D 30/70* (2020.08)

(56) References Cited

U.S. PATENT DOCUMENTS

| | | |
|---|---|---|
| 2012/0115459 A1 | 5/2012 | Deng et al. |
| 2013/0016613 A1 | 1/2013 | Huang et al. |
| 2013/0044668 A1 | 2/2013 | Purnadi |
| 2013/0058244 A1 | 3/2013 | Huang |
| 2013/0077513 A1 | 3/2013 | Ng et al. |
| 2013/0084910 A1 | 4/2013 | Suzuki et al. |
| 2013/0114568 A1 | 5/2013 | Sagae et al. |
| 2013/0137435 A1 | 5/2013 | Shi |
| 2013/0165124 A1 | 6/2013 | Liang et al. |
| 2013/0235844 A1 | 9/2013 | Ge et al. |
| 2013/0260741 A1 | 10/2013 | Yamada |
| 2013/0344869 A1 | 12/2013 | Yamada |

FOREIGN PATENT DOCUMENTS

| | | |
|---|---|---|
| CN | 102948190 | 2/2013 |
| CN | 103004256 | 8/2016 |
| JP | 2012529798 | 11/2012 |
| KR | 2013 003 6315 | 4/2013 |
| RU | 2008119377 | 12/2009 |
| WO | WO2011162134 | 12/2011 |

OTHER PUBLICATIONS

Ericsson et al., "Event triggering and measurement reporting in CA," R2-132799, 3GPP TSG-RAN, WG2#83, Barcelona, Spain, Aug. 19-23, 2013 (retrieved on Aug. 10, 2013), pp. 1-3.

Lg Electronics Inc, "Clarification of event A4 trigger in case of CA," R2-132870, 3GPP TSG-RAN, WG2 #83, Barcelona, Spain, Aug. 19-23, 2013 (retrieved on Aug. 10, 2013), pp. 12.

Lg Electronics Inc, "Clarification on Scell incusion in neighbour cell measurements," R2-133577, 3GPP TSG-RAN WG2 #83bis, Ljubljana, Slovenia, Oct. 7-11, 2013 (downloaded on Sep. 28, 2013), pp. 1-3.

MEASUREMENT REPORTING METHOD OF TERMINAL AND TERMINAL USING SAME

CROSS-REFERENCE TO RELATED APPLICATIONS

This application is a continuation of U.S. application Ser. No. 16/867,185, filed on May 5, 2020, which is a continuation of U.S. application Ser. No. 15/023,082, filed on Mar. 18, 2016, now U.S. Pat. No. 10,659,984, which is a National Stage application under 35 U.S.C. § 371 of International Application No. PCT/KR2014/008749, filed on Sep. 19, 2014, which claims priority under 35 U.S.C. 119(e) to U.S. Provisional Application No. 61/880,795, filed on Sep. 20, 2013. The disclosures of the prior applications are hereby incorporated by reference herein in their entirety.

BACKGROUND OF THE INVENTION

Field of the Invention

The present invention relates to a method for performing a measurement report of a terminal in a mobile communication system and a terminal for the same.

Related Art

The International Telecommunication Union Radio communication sector (ITU-R) performs a standardization work of International Mobile Telecommunication (IMT)-Advanced which is a next-generation mobile communication system after 3rd generation.

3rd Generation Partnership Project (3GPP) as a system standard that meets requirements of the IMT-Advanced prepares for LTE-Advanced (hereinafter, referred to as LTE-A) acquired by enhancing long term evolution (LTE) based on Orthogonal Frequency Division Multiple Access (OFDMA)/Single Carrier-Frequency Division Multiple Access (SC-FDMA). The LTE-A is one of dominant candidates for the IMT-Advanced.

Candidate technologies to be used in the LTE-A include carrier aggregation (CA). The carrier aggregation is a technology that aggregates a plurality of component carriers (CCs) having a narrow band to configure a wideband. The component carriers include a downlink component carrier and an uplink component carrier. A cell may be defined as a pair of the downlink component carrier and the uplink component carrier or the downlink component carrier and in this case, the carrier aggregation may be appreciated as aggregation of a plurality of cells.

In the carrier aggregation, a primary cell in which a terminal establishes an initial connection process/reconnection process with a base station and a secondary cell added in addition to the primary cell are provided.

Meanwhile, in a mobile communication system, supporting mobility of the terminal is required. To this end, the terminal continuously measures a quality for a serving cell providing a current service and a quality for a neighboring cell. The terminal reports a measurement result to a network at an appropriate time and the network provides optimal mobility to the terminal through handover, and the like.

The terminal may report the measurement result by a method triggered by an event. That is, when a specific event occurs, the terminal reports the measurement result. In this case, a target cell of each event is predetermined. For example, among events, events are for the serving cell, the neighboring cell, the primary cell, and the secondary cell, respectively or events are for combinations of the cells are provided. The secondary cell is basically treated as the serving cell, but may be treated as the neighboring cell in the specific event.

When the neighboring cell satisfies the specific event, the terminal makes the neighboring cell be included in 'cellsTriggeredList'. A current standard prescribes that the neighboring cell is included in 'measResultNeighCells' to be transmitted if the 'cellsTriggeredList' is not empty and the neighboring cell is not included in the 'measResultNeighCells' but excluded if the 'cellsTriggeredList' is empty.

The base station may add the neighboring cell to the terminal as the secondary cell by using a measurement report including the 'measResultNeighCells'. In this case, the neighboring cell needs to be basically treated as a serving cell.

However, the current standard does not prescribe modification of the 'cellsTriggeredList' when the neighboring cell is added as the secondary cell. Therefore, the neighboring cell continuously remains in the 'cellsTriggeredList', and as a result, the neighboring cell is included in the 'measResultNeighCells' to be transmitted.

This causes unnecessary measurement report transmission of the terminal to bring about battery consumption. Further, when the base station performs resource management based on the 'measResultNeighCells', ambiguity may occur.

SUMMARY OF THE INVENTION

The present invention provides a method for performing a measurement report and an apparatus for the same when a secondary cell is added to a terminal that supports carrier aggregation.

In one aspect, provided is a method for a measurement reporting of a user equipment (UE) configured a primary cell. The method includes adding a secondary cell, determining whether the secondary cell is applicable for an associated measurement and determining whether the secondary cell is included in a triggered cell list (cellsTriggeredList). If the secondary cell is not applicable for the associated measurement and if the secondary cell is included in the triggered cell list, the UE removes the secondary cell from the triggered cell list.

If the secondary cell satisfies a specific event, the UE may include the secondary cell in the triggered cell list.

The specific event may be an event that channel state of a neighbor cell is better than a threshold.

The triggered cell list may be transmitted through a radio resource control (RRC) message.

The triggered cell list may comprise a physical cell identity of a cell.

The primary cell may be a cell in which the UE performs an initial connection establishment procedure or a connection re-establishment procedure.

The secondary cell may be a cell which is used for providing additional radio resources in addition to the primary cell.

In another aspect, provided is a user equipment (UE) configured a primary cell. The UE includes a radio frequency (RF) unit for transmitting and receiving a radio signal and a processor coupled to the RF unit. The processor is configured to add a secondary cell, determine whether the secondary cell is applicable for an associated measurement and determine whether the secondary cell is included in a triggered cell list (cellsTriggeredList). If the secondary cell is not applicable for the associated measurement and if the secondary cell is included in the triggered cell list, the UE removes the secondary cell from the triggered cell list.

Since unnecessary measurement report transmission of a terminal can be reduced, power consumption of the terminal can be reduced. Further, ambiguity can be reduced in terms of resource management between a base station and the terminal.

DESCRIPTION OF EXEMPLARY EMBODIMENTS

Figure 1:
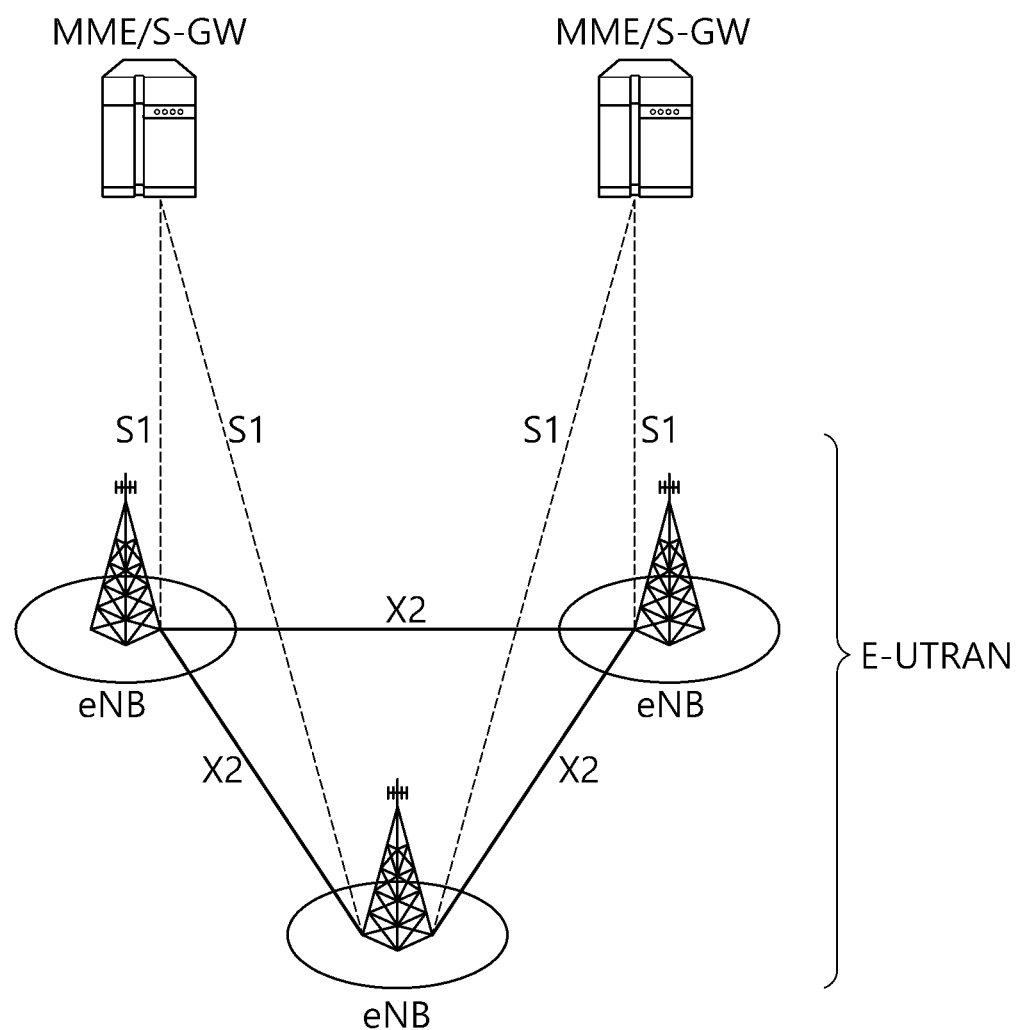
FIG. 1 shows a network structure of an evolved universal terrestrial radio access network (E-UTRAN) as an example of a mobile communication system.

As one example of a wireless communication system, a 3Gpp LTE/LTE-A based system is assumed, but various wireless communication systems may be variously applied, to which a carrier aggregation technology, such as an IEEE 802.16 based system, or the like may be applied. Throughout the specification, like reference numerals refer to like elements.

In the following description, 'measurement' may be prescribed as receiving reference signals received from cells positioned at inter-frequency, intra-frequency, and inter-radio access technology (RAT) according to measurement configuration which a terminal receives from a network to measure a quality value of a corresponding cell. Further, in the following description, the 'measurement' means a signal quality or a cell quality determined through the reference signal received from the measurement target cell.

As one example of a wireless communication/mobile communication system for applying the present invention, a 3GPP LTE system will be described in brief.

FIG. 1 shows a network structure of an evolved universal terrestrial radio access network (E-UTRAN) as an example of a mobile communication system. An E-UTRAN system is evolved from the legacy UTRAN system, and its basic standardization work is carried out in the current 3GPP. The E-UTRAN system is also referred to as a long term evolution (LTE) system.

The E-UTRAN consists of e-NodeBs (eNBs or base stations). The eNBs are connected with each other through an X2 interface. The eNB is connected to a user equipment (hereinafter, UE) through a radio interface, and is connected to an evolved packet core (EPC) through an S1 interface.

EPC comprises MME (Mobility Management Entity), S-GW(Serving-Gateway) and PDN-GW(Packet Data Network-Gateway). The MME has access information of the UE or information regarding capacity of the UE, and the information is frequently used in mobility management of the UE. The S-GW is a gateway having the E-UTRAN as an end point, and the P-GW is a gateway having the PDN as an end point.

Layers of a radio interface protocol between the UE and the network may be divided into a first layer L1, a second layer L2, and a third layer L3 based on three lower layers of an open system interconnection (OSI) standard model which is widely known in the communication system, and among them, a physical layer to which the first layer belongs provides an information transfer service using a physical channel, and a radio resource control (RRC) layer positioned on the third layer serves to control a radio resource between the UE and the network. To this end, the RRC layer exchanges an RRC message between the UE and the network.

Figure 2:
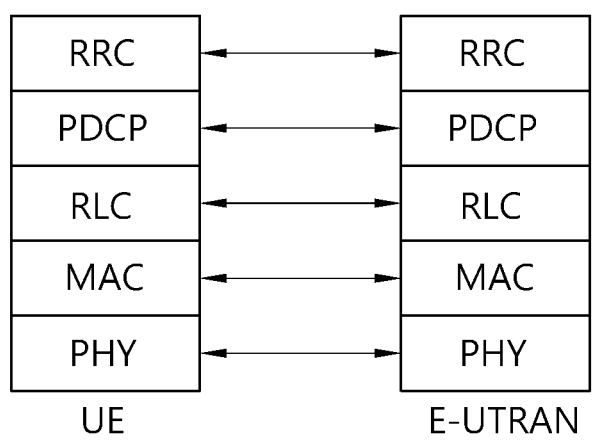
FIG. 2 and FIG. 3 show a structure of a radio interface protocol between a UE and an E-UTRAN on the basis of a 3GPP radio access network protocol.
Figure 3:
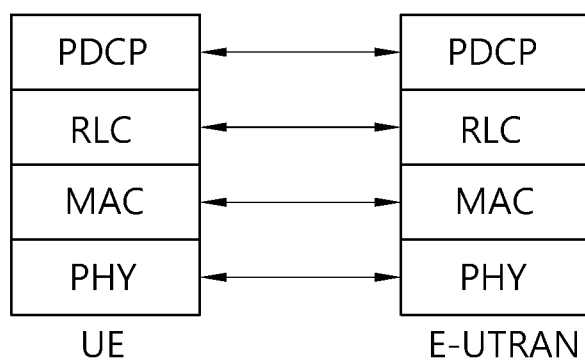

FIG. 2 and FIG. 3 show a structure of a radio interface protocol between a UE and an E-UTRAN on the basis of a 3GPP radio access network protocol.

The radio interface protocol horizontally includes a physical layer, a data link layer, and a network layer, and vertically includes a user plane (U-plane) for data information transfer and a control plane (C-plane) for control signaling delivery. Protocol layers of FIG. 2 and FIG. 3 can be classified into a first layer (L1), a second layer (L2), and a third layer (L3) on the basis of lower three layers of an open system interconnection (OSI) model that is well-known in the communication system. A pair of radio protocol layers exits between the UE and the UTRAN and serves to transmit data of a radio link.

Hereinafter, each of the radio protocol layers of the control plane of FIG. 2 and the user plane of FIG. 3 will be described.

A physical layer, i.e., a first layer, provides an upper layer with an information transfer service by using a physical channel. The physical layer is connected to a media access control (MAC) layer, i.e., an upper layer of the physical layer, via a transport channel. Data is transferred between the MAC layer and the physical layer through the transport channel. The data move between different PHY layers, that is, the PHY layers of the transmitter and the receiver through the physical channel. The physical channel may be modulated by an orthogonal frequency division multiplexing (OFDM) scheme, and use a time and a frequency as the radio resource.

The medium access control (hereinafter, MAC) layer in a second layer provides services to a radio link control (RLC) layer, i.e., an upper layer of the MAC layer, through a logical channel. A radio link control (hereinafter, RLC) layer in the second layer supports reliable data transfer. Functions of the RLC layer may be implemented as a function block included in the MAC layer. In this case, the RLC layer may not exist. A packet data convergence protocol (PDCP) layer in the second layer performs a header compression function for decreasing an Internet protocol (IP) header size containing relatively large and unnecessary control information in order to effectively transmit the IP packet through a radio interface when transmitting an IP packet such as an IPv4 packet or an IPv6 packet.

A radio resource control (hereinafter, RRC) layer in a third layer is defined only in the control plane. The RRC layer serves to control the logical channel, the transport channel, and the physical channel in association with configuration, reconfiguration, and release of radio bearers (RBs). In this case, the RB is a service provided by the second layer for data delivery between the UE and the E-UTRAN. When RRC connection is established between the RRC layer of the UE and the RRC layer of the E-UTRAN, the UE is in an RRC connected state, and if not, the UE is in an RRC idle state.

A downlink transport channel for transporting the data to the UE from the network includes a broadcast channel (BCH) for transporting system information and a downlink shared channel (SCH) for transporting user traffic or a control message. The traffic or the control message of a downlink multicast or broadcast service may be transported through the downlink SCH, or may be transported through a separate downlink multicast channel (MCH). Meanwhile, an uplink transport channel for transporting the data from the UE to the network includes a random access channel (RACH) for transporting an initial control message and an uplink shared channel (SCH) for transporting the user traffic or the control message in addition to the RACH.

A logical channel which is above the transport channel and mapped in the transport channel includes a broadcast control channel (BCCH), a paging control channel (PCCH), a common control channel (CCCH), a multicast control channel (MCCH), a multicast traffic channel (MTCH), and the like.

The physical channel is constituted by several OFDM symbols in a time domain and several sub-carriers in a frequency domain. One sub-frame is constituted by a plurality of OFDM symbols in the time domain. The RB as a resource allocation unit is constituted by a plurality of OFDM symbols and a plurality of sub-carriers. Further, each sub-frame may use specific sub-carriers of specific OFDM symbols (for example, first OFDM symbols) of the corresponding sub-frame for the physical downlink control channel (PDCCH), that is, a L1/L2 control channel. One sub-frame may consist of two slots having a length of 0.5 ms, which may correspond to 1 ms equivalent to a transmission time interval (TTI) as a unit time in which data is transmitted.

Next, system information in an LTE system will be described. The system information includes necessary information which must be known to a UE to access an eNB. Thus, the UE has to receive all pieces of system information before accessing the eNB. Further, the UE must always have recent system information. Since the system information is information which must be known to all UEs in one cell, the eNB periodically transmits the system information.

The system information is classified into a master information block (MIB), a scheduled block (SB), and a system information block (SIB). The MIB allows the UE to know a physical configuration (e.g., bandwidth) of a specific cell. The SB reports transmission information (e.g., a transmission period or the like) of SIBs. The SIB is a group of a plurality of pieces of system information related to each other. For example, one SIB includes only information of a neighbor cell, and another SIB includes only information of an uplink radio channel used by the UE.

Meanwhile, a service provided by the network to the UE may be classified into three types to be described below. The UE recognizes a cell type differently according to which service can be provided. A service type is first described below, and then the cell type will be described.

1) Limited service: This service provides an emergency call and an earthquake and tsunami warning system (ETWS), and can be provided in an acceptable cell.

2) Normal service: This service denotes a public use service for general use, and can be provided in a suitable cell.

3) Operator service: This service denotes a service for a network operator, and a corresponding cell can be used only by the network operator and cannot be used by a normal user.

A service type provided by a cell can be identified as follows.

1) Acceptable cell: A UE can receive a limited service in this cell. This cell is not barred from the perspective of the UE, and satisfies a cell selection criterion of the UE.

2) Suitable cell: The UE can receive a normal service in this cell. This cell satisfies a condition of an acceptable cell, and also satisfies additional conditions. Regarding the additional conditions, this cell must belong to a PLMN to which the UE can access, and a tracking area update procedure of the UE must not be barred in this cell. If a specific cell is a CSG cell, this cell must be accessible by the UE as a CSG member.

3) Barred cell: This is a cell which uses system information to broadcast that the cell is a barred cell.

4) Reserved cell: This is a cell which uses system information to broadcast that the cell is a reserved cell.

Hereinafter, an RRC state of the UE and an RRC connection method will be described. The RRC state means whether the RRC layer of the UE is logical-connected with the RRC layer of the E-UTRAN or not, and a case where the RRC layer of the UE is connected with the RRC layer of the E-UTRAN is called a RRC connection state, and a case where the RRC layer of the UE is not connected with the RRC layer of the E-UTRAN is called an RRC idle state. Since the RRC connection exists in the UE in the RRC connection state, the E-UTRAN may determine the existence of the corresponding UE in a cell unit, and as a result, the UE may be efficiently controlled. On the other hand, the UE in the RRC idle state may not be determined by the E-UTRAN, and a core network (CN) is managed by a tracking area unit which is a larger area unit than the cell. That is, in the UE in the RRC idle state, only the existence is determined by a large area unit, and the UE needs to move in the RRC connection state in order to receive a general mobile communication service such as voice or data When the user first turns on the power of the UE, the UE first searches a proper cell and then stays in the RRC idle state in the corresponding cell. The UE in the RRC idle state establishes the RRC connection with the E-UTRAN through an RRC connection procedure only when the RRC connection is required, and is transited into the RRC connection state. There are several cases where the UE in the RRC idle state requires the RRC connection, and for example, uplink data transmission is required due to reasons such as user's call attempt, or a response message to a case where a paging message is received from the E-UTRAN is transmitted.

A non-access stratum (NAS) layer positioned above the RRC layer performs functions such as a session management and a mobility management.

In the NAS layer, in order to manage mobility of the UE, two states of EDEPS mobility management-REGISTERED (EMM-REGISTER) and EMM-DEREGISTERED are defined, and the two states are applied to the UE and the MME. The initial UE is in the EMM-DEREGISTERED state, and the UE performs a procedure of registering the UE in the corresponding network through an initial attaching procedure so as to be connected to the network. When the attaching procedure is successfully performed, the UE and the MME are in the EMM-REGISTERED state.

In order to manage signaling connection between the UE and the EPC, two states of an EPS connection management (ECM)-IDLE state and an ECM-CONNECTED state, and the two states are applied to the UE and the MME. When the UE in the ECM-IDLE state is RRC-connected with the E-UTRAN, the corresponding UE becomes in the ECM-CONNECTED state. When the MME in the ECM-IDLE state is S1-connected with the E-UTRAN, the corresponding MME becomes in the ECM-CONNECTED state. When the UE is in the ECM-IDLE state, the E-UTRAN does not have context information of the UE. Accordingly, the UE in the ECM-IDLE state performs a procedure related with the mobility based on the UE such as cell selection or cell reselection without receiving a command of the network. On the contrary, when the UE is in the ECM-CONNECTED state, the mobility of the UE is managed by the command of the network. When a position of the UE in the ECM-IDLE state is different from a position which is known to the network, the UE notifies the corresponding position of the UE to the network through a tracking area updating procedure.

Figure 4:
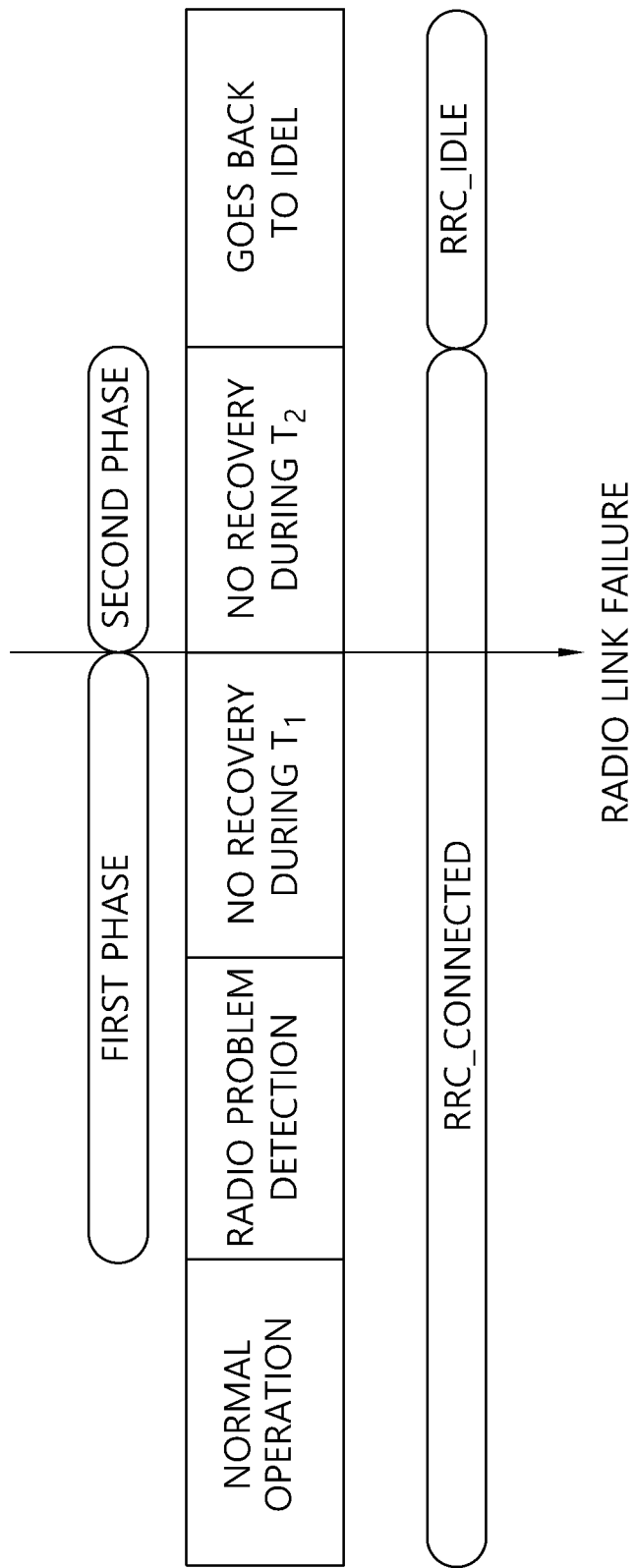
FIG. 4 is a picture for describing radio link failure procedure.

FIG. 4 shows a radio link failure procedure in a 3GPP LTE system.

A UE persistently performs a measurement to maintain a communication link quality with a cell in which the UE receives a service. In particular, the UE determines whether the communication link quality with the cell in which the UE currently receives and provides the service is in a communication disabled situation. If it is determined that the quality of the current cell is so poor that communication is impossible at present, the UE declares a radio link failure. If the UE declares the radio link failure, the UE gives up maintaining of communication with this cell, selects a cell through a cell selection procedure, and thereafter attempts an RRC connection reconfiguration. As such, an operation related to the radio link failure may be described in two phases as shown in FIG. 4.

In a first phase, the UE examines whether a current communication link has a problem. If there is the problem, the UE declares a radio link problem, and waits until this communication link is recovered during a specific time $T_1$. If the link is recovered during this time, the UE continues a normal operation. If the radio link problem is not recovered during the time $T_1$ in the first phase, the UE declares the radio link failure, and enters a second phase. In the second phase, the UE performs an RRC connection re-establishment procedure to recover from the radio link failure.

The RRC connection re-establishment procedure is a procedure of reconfiguring an RRC connection again in an RRC_CONNECTED state. Since the UE remains in the RRC_CONNECTED state, that is, does not enter an RRC_IDLE state, the UE does not initiate all radio configurations (e.g., radio bear configurations) thereof. Instead, the UE temporarily suspends the use of all radio bearers except for an SRB0 when starting the RRC connection re-establishment procedure. If the RRC connection reconfiguration is successful, the UE resumes the use of the radio bearers of which the use is temporarily suspended.

Figure 5:
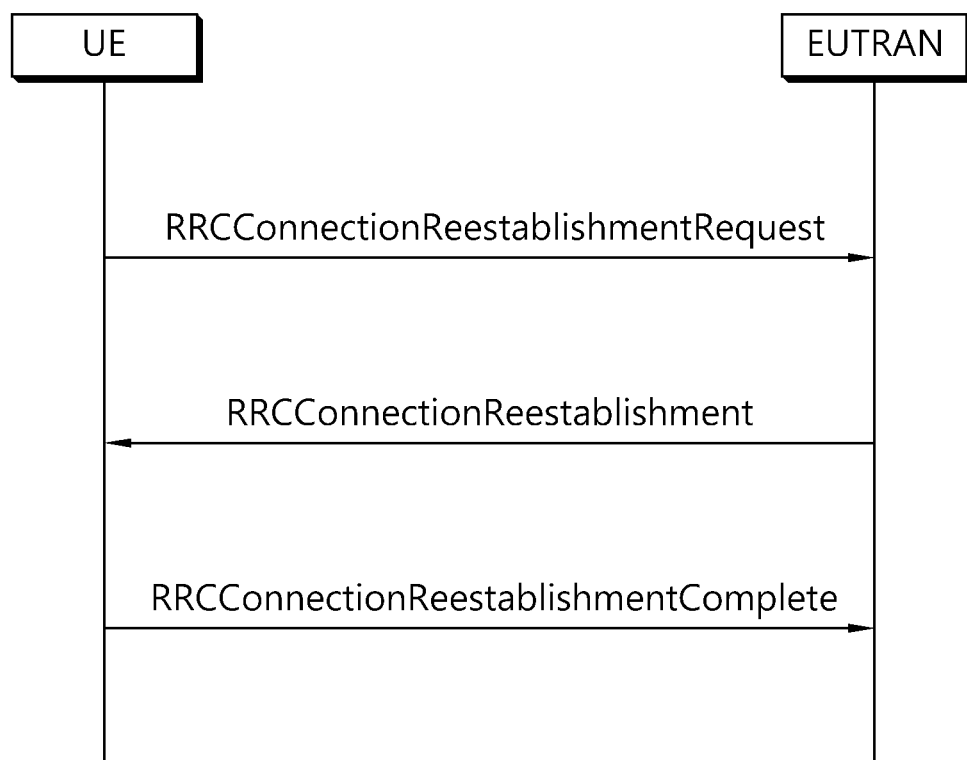
FIG. 5 and FIG. 6 show success and failure cases of an RRC connection re-establishment procedure.
Figure 6:
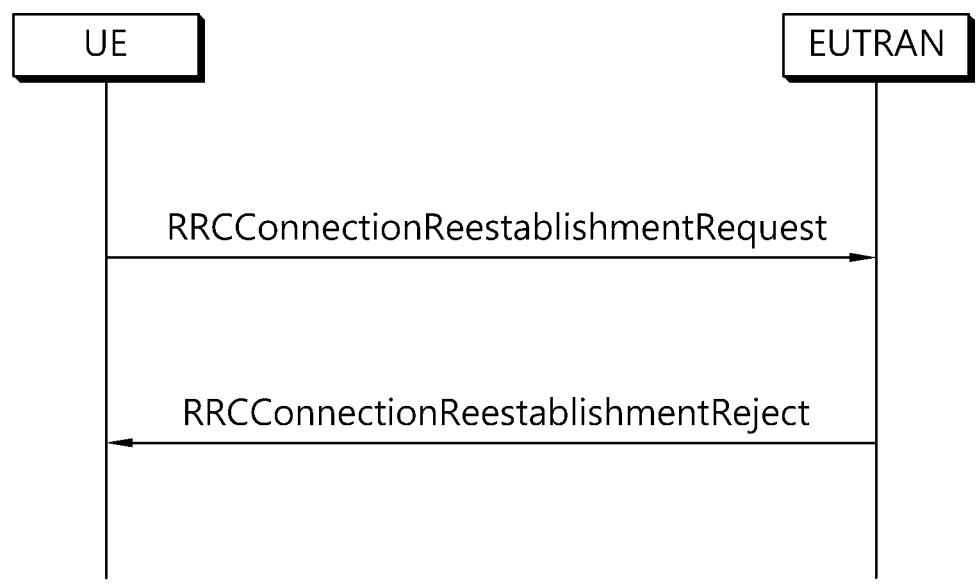

FIG. 5 and FIG. 6 show success and failure cases of an RRC connection re-establishment procedure.

Referring to FIG. 5 and FIG. 6, an operation of a UE in an RRC connection re-establishment procedure will be described. First, the UE performs a cell selection to select one cell. In the selected cell, the UE receives system information to receive basic parameters for a cell access. Subsequently, the UE attempts an RRC connection re-establishment through a random access procedure. If a cell selected by the UE through the cell selection is a cell having a context of the UE, that is, a prepared cell, the cell may accept an RRC connection re-establishment request of the UE, and thus the RRC connection re-establishment procedure may be successful. However, if the cell selected by the UE is not the prepared cell, since the cell does not have the context of the UE, the RRC connection re-establishment request of the UE cannot be accepted. Therefore, the RRC connection re-establishment procedure fails.

Hereinafter, a quality measurement procedure in a 3GPP LTE system will be described.

Figure 7:
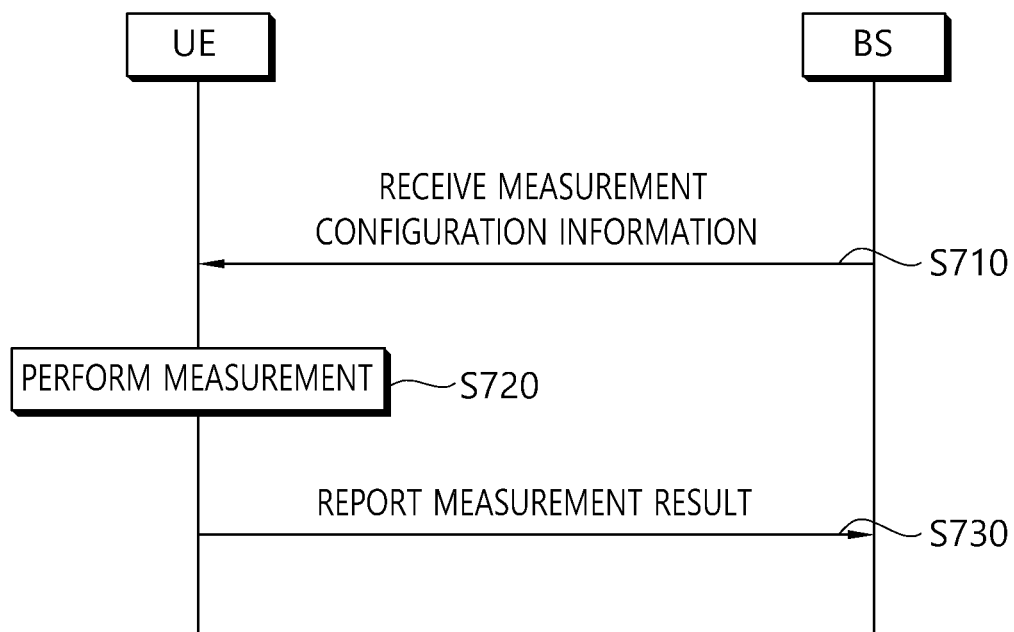
FIG. 7 shows a procedure in which a UE performs a measurement to report to a network in a 3GPP LTE system.

FIG. 7 shows a procedure in which a UE performs a measurement to report to a network in a 3GPP LTE system.

First, the UE may receive measurement configuration information from a BS (S710). Hereinafter, a message including the measurement configuration information is called a measurement configuration message. The UE may perform a measurement on the basis of the measurement configuration information (S720). If a measurement result satisfies a report condition in the measurement configuration information, the UE may report a measurement result to the BS (S730). Hereinafter, a message including the measurement result is called a measurement report message.

Meanwhile, the measurement configuration message received from the BS may have the following structure.

TABLE 1

```
RRCConnectionReconfiguration-r8-IEs ::= SEQUENCE {
    measConfig                      MeasConfig
    OPTIONAL,                       -- Need ON
}
MeasConfig ::=                      SEQUENCE {
    -- Measurement objects
    measObjectToRemoveList          MeasObjectToRemoveList
    measObjectToAddModList          MeasObjectToAddModList
    -- Reporting configurations
    reportConfigToRemoveList        ReportConfigToRemoveList
    reportConfigToAddModList        ReportConfigToAddModList
    -- Measurement identities
    measIdToRemoveList              MeasIdToRemoveList
    measIdToAddModList              MeasIdToAddModList
    -- Other parameters
    quantityConfig                  QuantityConfig
    measGapConfig                   MeasGapConfig
    OPTIONAL,                       -- Need ON
    s-Measure                       RSRP-Range
    OPTIONAL,                       -- Need ON
    preRegistrationInfoHRPD         PreRegistrationInfoHRPD
    speedStatePars                  CHOICE {
        release                         NULL,
        setup                           SEQUENCE {
            mobilityStateParameters         MobilityStateParameters,
            timeToTrigger-SF                SpeedStateScaleFactors
```

TABLE 1-continued

```
        }
    }
                                          OPTIONAL,
    -- Need ON
        ...
}
```

The measurement configuration information in the measurement configuration message exemplified in Table 1 above will be described as follows.

(1) Measurement object information: The measurement object information is information on an object for which the UE is to perform a measurement. A measurement object may include at least one of an intra-frequency measurement object which is an object of an intra-cell measurement, an inter-frequency measurement object which is an object of an inter-cell measurement, and an inter-RAT measurement object which is an object of an inter-RAT measurement. For example, the intra-frequency measurement object may indicate the neighbor cell having the same frequency band as the serving cell, the inter-frequency measurement object may indicate the neighbor cell having the different frequency band from the serving cell, and the inter-RAT measurement object may indicate a neighbor cell of RAT different from the RAT of the serving cell.

(2) Reporting configuration information: The reporting configuration information is information on a reporting condition and a reporting type regarding the time when the UE reports the measurement result. The reporting condition may include information on an event or a cycle in which reporting the measurement result is triggered. The reporting type is information regarding a configuration type of the measurement result.

(3) Measurement identity information: The measurement identity information is information regarding a measurement identity that determines a measurement object, a reporting time, and a reporting type by the UE by associating the measurement object and the reporting configuration with each other. The measurement identity information is included in the measurement reporting message to represent a measurement object of the measurement result and a reporting condition of the measurement reporting which occurs.

(4) Quantity configuration information: The quantity configuration information is information on a parameter for configuring filtering of a measurement unit, a reporting unit, and/or a measurement result value.

(5) Measurement gap information: The measurement gap information is information on a measurement gap which is an interval which the UE may use for only measurement without considering data transportation with the serving cell because downlink transportation or uplink transportation is not scheduled.

The UE may have a measurement object list, a measurement reporting configuration list, and a measurement identity list in order to perform a measurement procedure.

In the 3GPP LTE, the base station may configure only one measurement object for one frequency band to the UE. According to Clause 5.5.4 of 3GPP TS 36.331 V8.5.0 (2009-03) "Evolved Universal Terrestrial Radio Access (E-UTRA) Radio Resource Control (RRC); Protocol specification (Release 8)", events that trigger the measurement reporting shown in the following table are defined.

TABLE 2

| Event | Report condition |
|---|---|
| Event A1 | Serving becomes better than threshold |
| Event A2 | Serving becomes worse than threshold |
| Event A3 | Neighbor becomes offset better than serving |
| Event A4 | Neighbor becomes better than threshold |
| Event A5 | Serving becomes worse than threshold1 and neighbor becomes better than threshold2 |
| Event B1 | Inter RAT neighbor becomes better than threshold |
| Event B2 | Serving becomes worse than threshold1 and inter RAT neighbor becomes better than threshold2 |

Referring to Table 2 given above, for example, event A1 is an event in which a serving cell has a better channel state than a threshold, event A2 is an event in which the serving cell has a worse channel state than the threshold, and event A3 is an event in which a neighboring cell has the better channel state than the serving cell by an offset value. As another example, it may be known that event A4 is an event in which the neighboring cell shows the better channel state than the threshold. Event A5 is an event in which the serving cell has a worse channel state than threshold 1 and the neighboring cell has a better channel state than threshold 2.

When a measurement result of the terminal (UE) satisfies the event (quality measurement report criterion), the terminal transmits a measurement report message to the base station.

Figure 8:
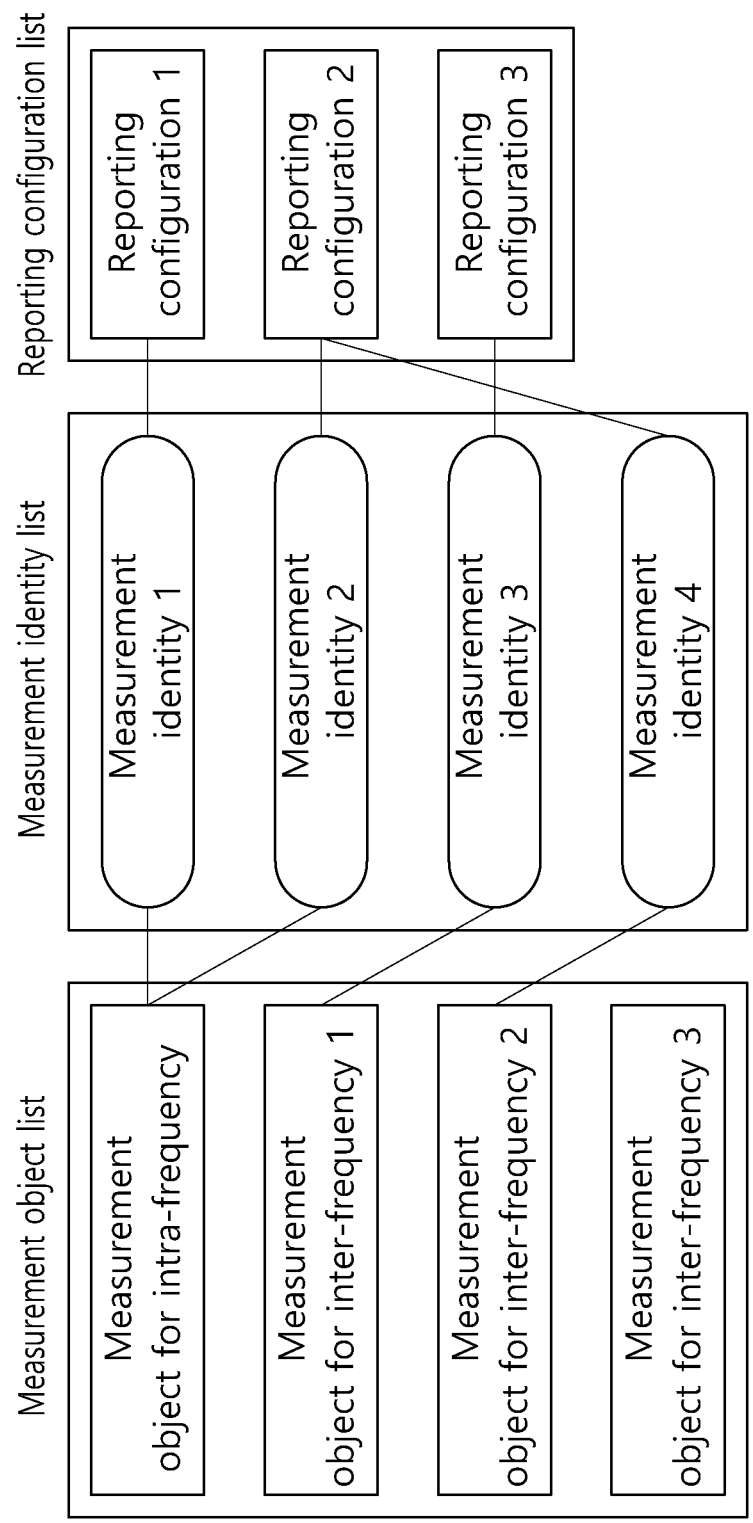
FIG. 8 shows an example of a measurement configuration configured in a UE.

FIG. 8 shows an example of a measurement configuration configured in a UE.

In the example of FIG. 8, First, measurement identity 1 connects the intra-frequency measurement object and reporting configuration 1. The UE performs intra frequency measurement and the reporting configuration 1 is used to determine a reference and a reporting type of reporting the measurement result.

Measurement identity 2 is connected with the intra-frequency measurement object similarly to the measurement identity 1, but the intra-frequency measurement object is reporting configuration 2. The UE performs measurement and the reporting configuration 2 is used to determine the reference and the reporting type of reporting the measurement result.

By the measurement identity 1 and the measurement identity 2, the UE transports the measurement result even though the measurement result for the intra-frequency measurement object satisfies any one of the reporting configuration 1 and the reporting configuration 2.

Measurement identity 3 connects inter-frequency measurement object 1 and reporting configuration 3. When a measurement result for the inter-frequency measurement object 1 satisfies a reporting condition included in the reporting configuration 1, the UE reports the measurement result.

Measurement identity 4 connects the inter-frequency measurement object 2 and the reporting configuration 2. When a measurement result for the inter-frequency measurement object 2 satisfies a reporting condition included in the reporting configuration 2, the UE reports the measurement result.

Measurement identity connects measurement target and report configuration. Each report configuration may comprise an event triggering a measurement report. Therefore, it can be expressed measurement identity connects the measurement target and the specific event. Here, it can be expressed that the measurement for evaluating whether the specific event is satisfied and the measurement target are associated (Or it can be expressed, for a convenience, that the specific event is the measurement associated with the measurement target).

Meanwhile, the measurement object, the reporting configuration, and/or the measurement identity may be added, changed, and/or deleted. These may be instructed when the base station sends a new measurement configuration message or a measurement configuration change message to the UE.

Figure 9:
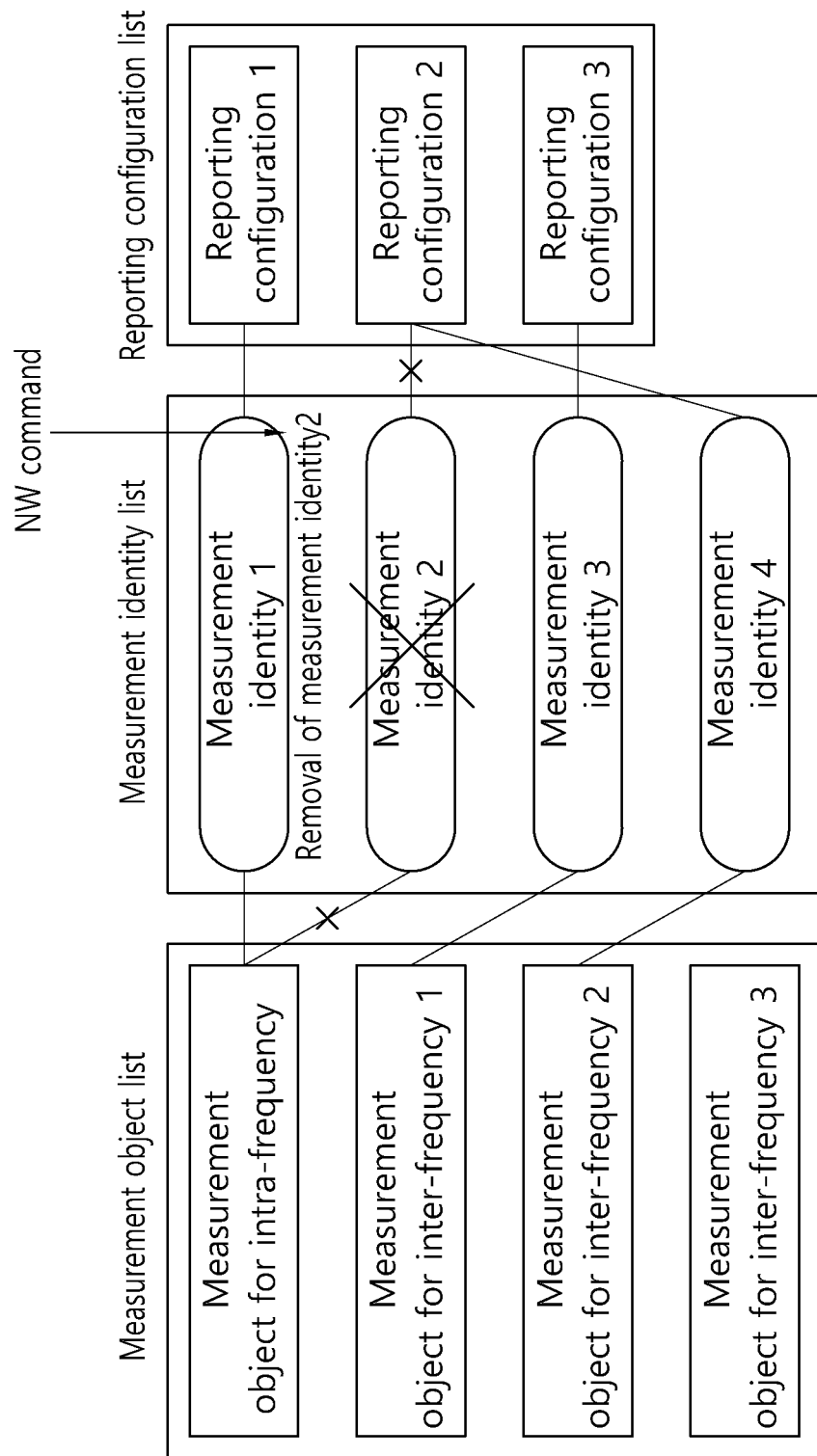
FIG. 9 shows an example of deleting a measurement identity.

FIG. 9 shows an example of deleting a measurement identity.

In FIG. 9, a "NW command" may be a measurement configuration message or a measurement configuration change message which instructs to delete a measurement identity 2. If the measurement identity 2 is deleted, measurement for a measurement object associated with the measurement identity 2 902 is stopped and a measurement report is not transported. A measurement object or a reporting configuration associated with the deleted measurement identity may not be changed.

Figure 10:
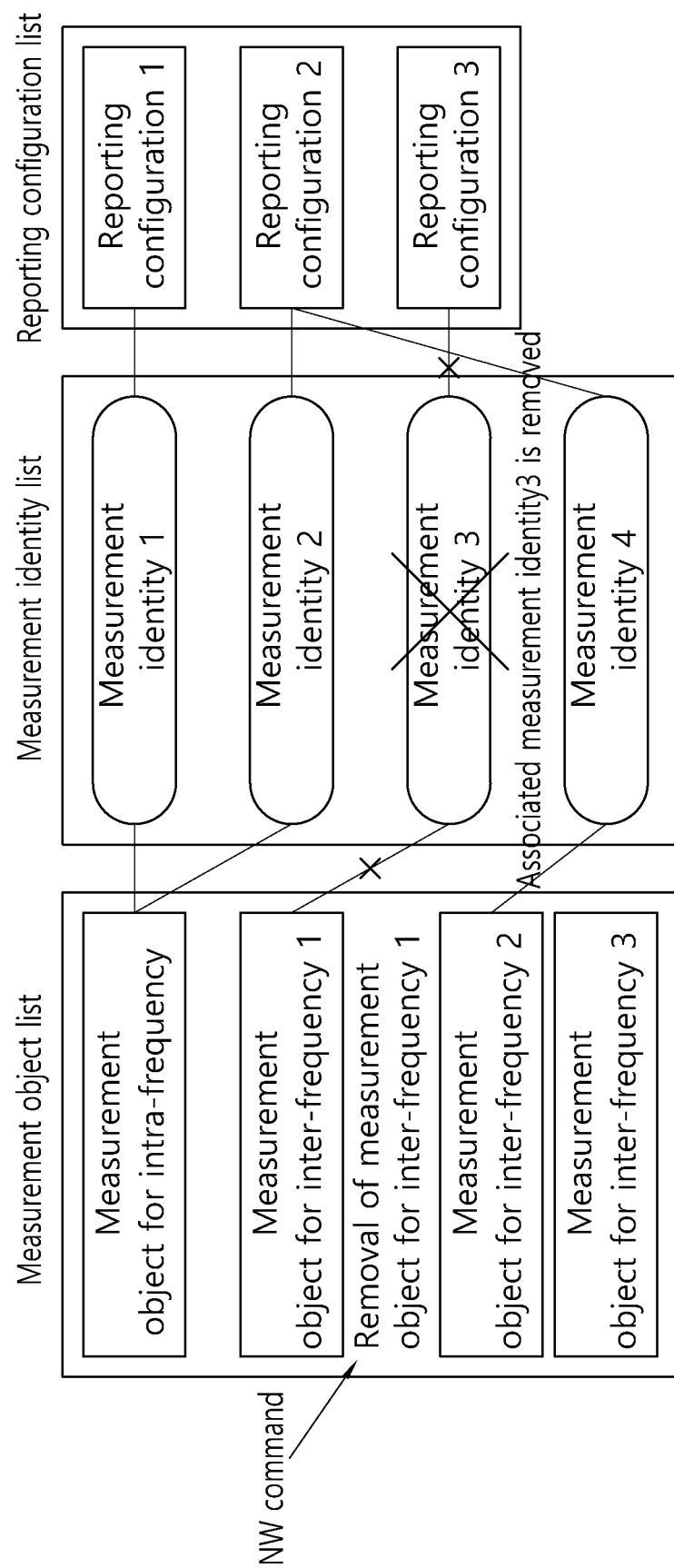
FIG. 10 shows an example of deleting a measurement object.

FIG. 10 shows an example of deleting a measurement object.

In FIG. 10, a "NW command" may be a measurement configuration message or a measurement configuration message which instructs to delete an inter-frequency measurement object 1. If the inter-frequency measurement object 1 is deleted, a UE may also delete a related measurement identity 3. Accordingly, a measurement for the inter-frequency measurement object 1 is suspended, and a measurement report may not be transmitted. However, a report configuration related to the deleted inter-frequency measurement object 1 may not be changed or deleted.

When the reporting configuration is removed, the UE removes even a measurement identity associated therewith. The UE stops measurement for an associated measurement object by the associated measurement identity. However, the measurement object associated with the deleted reporting configuration may not be changed or deleted.

Figure 11:
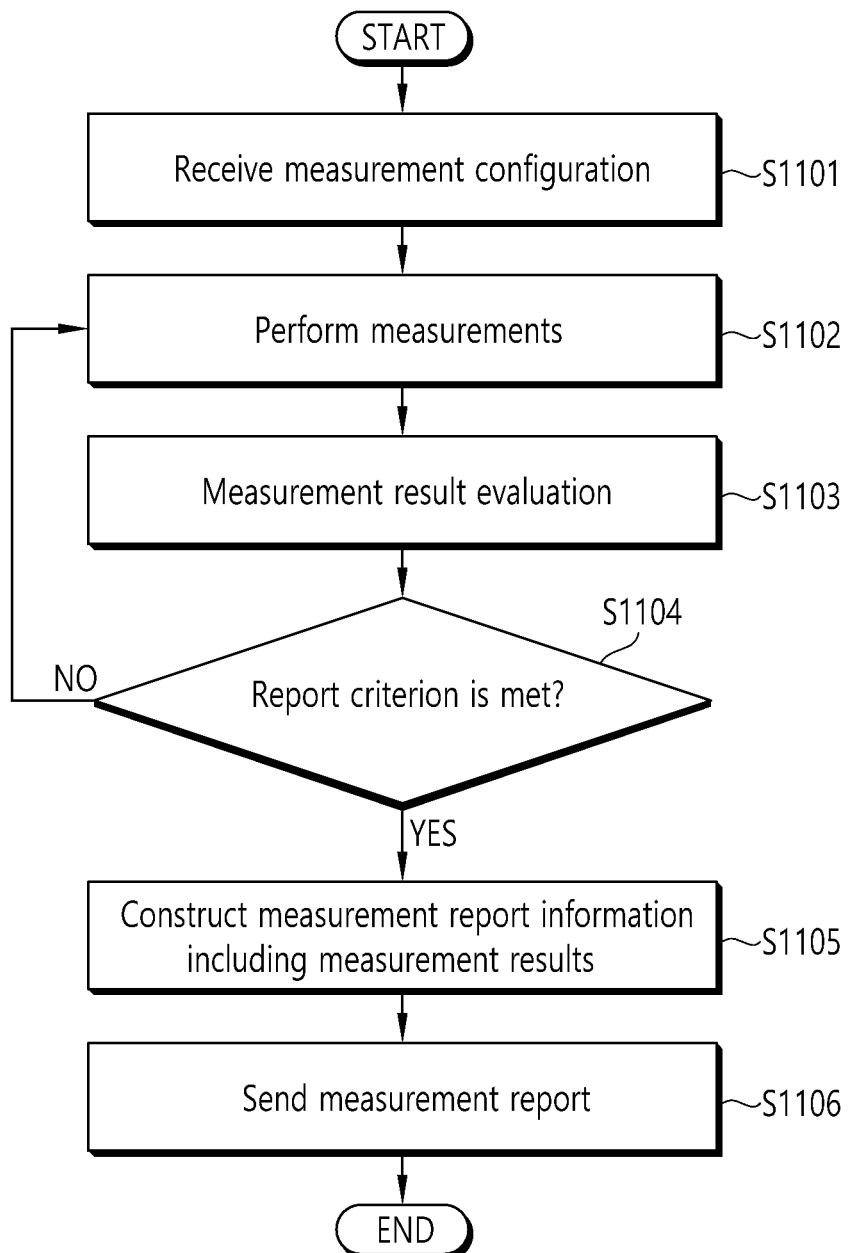
FIG. 11 is a drawing for describing the aforementioned measurement operation in summary.

FIG. 11 is a drawing for describing the aforementioned measurement operation in summary.

A UE may receive measurement configuration information from an eNB (or a network) (S1101). As described above with reference to Table 1 above, the measurement configuration information may include measurement object information, reporting configuration information, measurement identity information, quantity configuration information, and measurement gap information. In addition, as described above with reference to FIG. 9 and FIG. 10, the measurement configuration information may include information such as a specific measurement object and/or a specific measurement identity deletion/addition or the like.

Table 3 shows one example of a conventional report configuration message.

TABLE 3

```
-- ASN1START
ReportConfigEUTRA ::=            SEQUENCE {
    triggerType                      CHOICE {
        event                            SEQUENCE {
            eventId                          CHOICE {
                eventA1                          SEQUENCE {
                    a1-Threshold                     ThresholdEUTRA
                },
                eventA2                          SEQUENCE {
                    a2-Threshold                     ThresholdEUTRA
                },
                eventA3                          SEQUENCE {
                    a3-Offset                        INTEGER (-30..30),
                    reportOnLeave                    BOOLEAN
                },
                eventA4                          SEQUENCE {
                    a4-Threshold                     ThresholdEUTRA
                },
                eventA5                          SEQUENCE {
                    a5-Threshold1                    ThresholdEUTRA,
                    a5-Threshold2                    ThresholdEUTRA
                },
                ...,
                eventA6-r10                      SEQUENCE {
                    a6-Offset-r10                    INTEGER (-30..30),
                    a6-ReportOnLeave-r10             BOOLEAN
                }
            },
            hysteresis                       Hysteresis,
            timeToTrigger                    TimeToTrigger
        },
        periodical                       SEQUENCE {
            purpose                          ENUMERATED {
                                        reportStrongestCells, reportCGI}
        }
    },
    triggerQuantity                  ENUMERATED {rsrp, rsrq},
    reportQuantity                   ENUMERATED    {sameAsTriggerQuantity, both},
    maxReportCells                   INTEGER (1..maxCellReport),
    reportInterval                   ReportInterval,
    reportAmount                     ENUMERATED{r1, r2, r4, r8, r16, r32, r64, infinity},
    ...,
    [[ si-RequestForHO-r9            ENUMERATED {setup}
            OPTIONAL,                    -- Cond reportCGI
```

TABLE 3-continued

```
    ue-RxTxTimeDiffPeriodical-r9           ENUMERATED {setup}
        OPTIONAL                       -- Need OR
    ]],
    [[ includeLocationInfo-r10             ENUMERATED {true}
        OPTIONAL,                      -- Need OR
    reportAddNeighMeas-r10                 ENUMERATED {setup}
        OPTIONAL                       -- Need OR
    ]]
}
ThresholdEUTRA ::=                         CHOICE{
    threshold-RSRP                             RSRP-Range,
    threshold-RSRQ                             RSRQ-Range
}
-- ASN1STOP
```

In Table 3, 'a3-Offset/a6-Offset' represents an offset value in a measurement report triggering condition for event A3/A6.

'aN-ThresholdM' represents a threshold used in a measurement report triggering condition for event aN.

'eventId' represents selection of E-UTRA for an event triggering report requirement.

'maxReportCells' represents the maximum number (excluding the serving cell) of cells included in the measurement report.

'reportAmount' represents the number of measurement reports which may be applied to triggerType in addition to triggerType periodical.

reportOnLeave/a6-reportOnLeave indicates whether a measurement report process needs to start when satisfying a leaving condition with respect to one cell in cellsTriggeredList.

reportQuantity represents a quantity to be included in the measurement report.

timeToTrigger represents a time when an event needs to satisfy a specific condition in order to trigger the measurement report.

triggerQuatity represents a quantity used for evaluating the condition to trigger the event.

The UE may perform a quality measurement according to the received measurement configuration information (S1102). Accordingly, the UE may perform a measurement result evaluation procedure for determining whether a quality measurement result value satisfies a quality report criterion (S1103). In this case, an evaluation criterion may use methods shown in Table 2 above. If the measurement result satisfies the report criterion (S1104), the UE may construct measurement report information including the measurement result (S1105), and may transmit the information to the eNB (i.e., the network) (S1106). An exemplary structure of the measurement report message that can be used when it is applied to the 3GPP LTE system is as follows.

TABLE 4

```
    MeasResults ::=                        SEQUENCE {
        measId                                 MeasId,
        measResultServCell                     SEQUENCE {
            rsrpResult                             RSRP-Range,
            rsrqResult                             RSRQ-Range
        },
        measResultNeighCells                   CHOICE {
        measResultListEUTRA                    SEQUENCE (SIZE
        (1..maxCellReport)) OF
            physCellId                             PhysCellId,
            measResult                             SEQUENCE {
                rsrpResult   RSRP-Range                OPTIONAL,
                rsrqResult   RSRQ-Range                OPTIONAL,
```

TABLE 4-continued

```
                ...,
            }
        }
```

Information included in the measurement report message exemplified in Table 4 above may be as follows.

measurement identity (measId): It is a measurement identity related to the report configuration of which the report criterion is satisfied. The network may know which criterion is used to transmit the measurement report received from the UE through this measurement identity.

measured serving cell's quality value (measResultServCell): It is a quality value of a serving cell measured by the UE. For example, it may include a reference signal received power (RSRP) and a reference signal received quality (RSRQ).

measured neighbour cell's information (measResultNeighCells): It is a measurement identity of a neighbour cell measured by the UE, and includes the followings.

neighbour cell identity (physCellId): In general, it is a physical cell identity (e.g., PCI for E-UTRAN) of a neighbour cell satisfying a report criterion.

neighbour cell's quality value (measResult): In general, it is a quality value (e.g., RSRP, RSRQ) of a neighbour cell satisfying a report criterion.

The measurement report message may be transmitted in the form of a higher layer signal, for example, an RRC message.

According to the aforementioned example, the terminal efficiently performs a quality measurement of the serving cell and/or neighboring cell and reports the quality measurement to the base station to guarantee mobility of the terminal. However, in the present invention, when the secondary cell is additionally added to the terminal with respect to such a measurement operation, an efficient measurement report operation is intended to be proposed. To this end, first, as one example of a case in which the terminal has a plurality of serving cells, a carrier aggregation (CA) technology discussed in a 3GPP LTE-A standard will be described.

Figure 12:
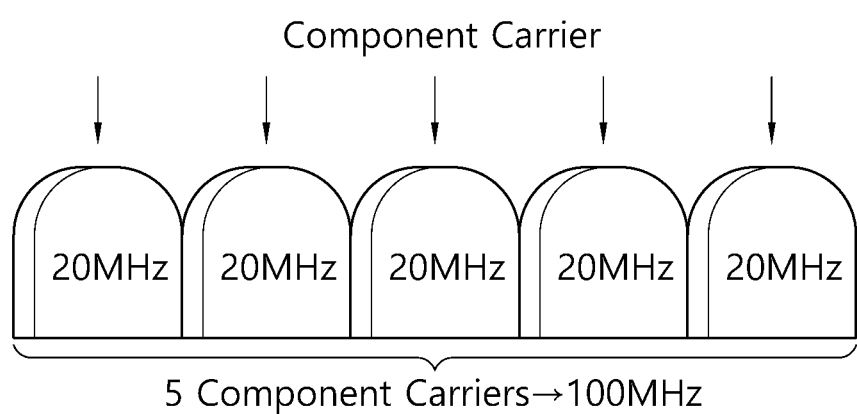
FIG. 12 is a drawing for describing a carrier aggregation technique applied to a 3GPP LTE-A system.

FIG. 12 is a diagram for describing a carrier aggregation technology applied to a 3GPP LTE-A system.

An LTE-A technology standard as an IMT-Advanced candidate technology of the International Telecommunication Union (ITU) is designed to meet IMT-Advanced technological requirements of the ITU. As a result, in LTE-A, a discussion about extending a bandwidth as compared with the conventional LTE system is in progress in order to satisfy the requirements of the ITU. In the LTE-A system, in order to extend the bandwidth, a carrier which may be provided in the conventional LTE system is defined as a component carrier (hereinafter, referred to as CC) and it is discussed that a maximum of 5 CCs may be bound and used. Since the CC may have a maximum of 20 MHZ bandwidth like the LTE system, the CC is a concept to extend the bandwidth up to at least 100 MHz. A technology that binds and uses a plurality of CCs is called carrier aggregation (CA).

Figure 13:
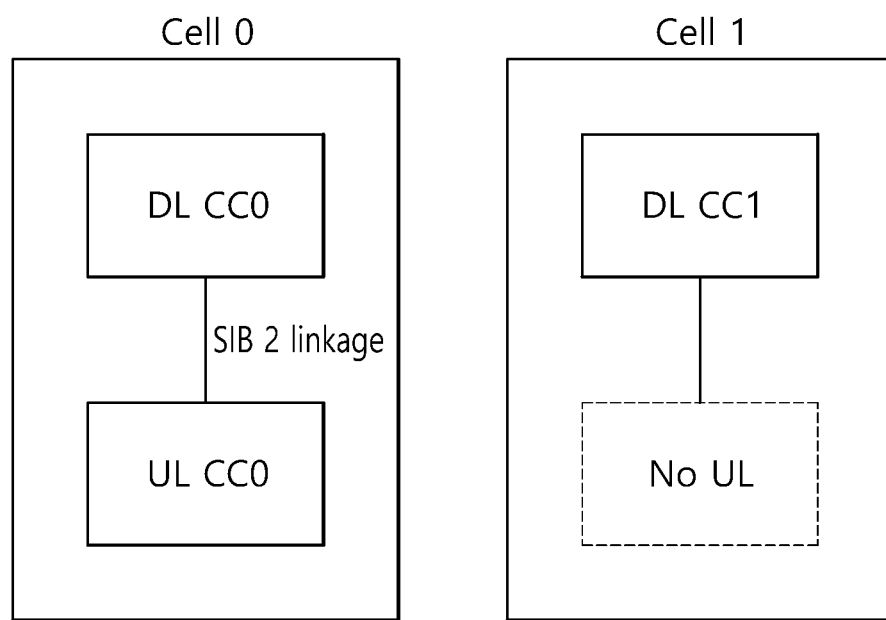
FIG. 13 is a drawing for describing a definition on a cell from a perspective of a UE when a carrier aggregation technique is applied.

FIG. 13 is a diagram for describing a definition of a cell from the point of view of a terminal when a carrier aggregation technology is applied.

As described above in association with FIG. 12, when the CA is applied, each of a downlink (DL) and an uplink (UL) may include a plurality of CCs. In such a system, from the viewpoint of the terminal, each of a combination (cell 0 of FIG. 13) of the DL CC and the UL CC or only the DL CC (cell 1 of FIG. 13) may be regarded as the cell. As illustrated in FIG. 13, a connection relationship between the DL CC and the UL CC may be indicated through system information transmitted through a DL resource. That is, system information of the mobile communication system to which the CA is applied additionally includes information on the connection relationship between the UL CC and the UL CC and is illustrated as an SIB2 linkage in FIG. 13.

Meanwhile, in the LTE-A system, proposed is a concept in which CCs to which all control signaling is transmitted are distinguished from other CCs are referred to as primary CCs. A UL primary CC and a DL primary CC are constituted per each terminal and a combination of a UL primary CC used for UL control information transmission and a DL primary CC used for DL control information transmission may be referred to as a primary cell or PCell. Except for the primary cell or PCell, cells constituted in the terminal may be referred to as a secondary cell or SCell.

Alternatively, the primary cell is a cell that operates in a primary frequency and may be defined as a cell in which the terminal starts an initial connection establishment procedure or a connection re-establishment procedure. Alternatively, the primary cell may be defined as a cell indicated as the primary cell during a handover process.

The secondary cell is a cell that operates in a secondary frequency and may be defined as a cell used for providing an additional radio resource except for the primary cell. After RRC connection establishment, the secondary cell may be configured.

Now, the present invention will be described.

According to a current standard regulation, the terminal operates as follows in association with the measurement report triggered by the event.

1. Triggering phase.

1) The terminal determines which cell is applicable to a predetermined event. For example, only the serving cell may be applied to events A1 and A2 and only the neighboring cell may be applied to event A4. That is, the serving cell is an applicable cell with respect to events A1 and A2 and the neighboring cell is the applicable cell with respect to event A4.

However, the secondary cell is exceptionally regarded as the neighboring cell with respect to events A3 and A5. In another case, the secondary cell is regarded as the serving cell. That is, an exceptional rule for the secondary cell is applied to events A3 and A5.

2) The terminal evaluates whether to satisfy a concerned event with respect to the applicable cell(s).

3) If the applicable cell satisfies the concerned event, the cell is included in a cell list ('cellsTriggeredList', hereinafter, the same as above). The triggered cell list may be a list including cells that satisfy a specific event. The triggered cell list may be a list including cells that satisfy each event among applicable cells to each event. The triggered cell list may be configured for each event or for a plurality of events. The triggered cell list may include a physical cell identity (ID) of the cell.

2. Reporting phase.

4) The terminal constitutes 'measResultPcell' and 'measResultSeryFreqList'. Only when an applicable neighboring cell which needs to be reported is present, the terminal constitutes 'measResultNeighCells'. Among events of the 'cellsTriggeredList', an applicable neighboring cell which needs to be reported with respect to the concerned event may be included in the 'measResultNeighCells'.

A table given below shows a detailed example of the measurement report message which the terminal reports.

TABLE 5

| | |
|---|---|
| -- ASN1START | |
| MeasResults ::= | SEQUENCE { |
|   measId | MeasId, |
|   measResultPCell | SEQUENCE { |
|     rsrpResult | RSRP-Range, |
|     rsrqResult | RSRQ-Range |
|   }, | |
|   measResultNeighCells | CHOICE { |
|     measResultListEUTRA | MeasResultListEUTRA, |
|     measResultListUTRA | MeasResultListUTRA, |
|     measResultListGERAN | MeasResultListGERAN, |
|     measResultsCDMA2000 | MeasResultsCDMA2000, |
| ... | |
| MeasResultServFreq-r10 ::= | SEQUENCE (SIZE (1..maxServCell-r10)) OF MeasResultsServFreq-r10 |
| MeasResultServFreq-r10 ::= | SEQUENCE { |
|   servFreqId-r10 | ServCellIndex-r10, |
|   measResultSCell-r10 | SEQUENCE { |
|     rsrpResultSCell-r10 | RSRP-Range, |
|     rsrqResultSCell-r10 | RSRQ-Range |
|   } | OPTIONAL, |
|   measResultBestNeighCell-r10 | SEQUENCE { |
|     physCellId-r10 | PhysCellId, |
|     rsrpResultNCell-r10 | RSRP-Range, |
|     rsrqResultNCell-r10 | RSRQ-Range |
|   } | OPTIONAL, |
| ... | |
| } | |

Meanwhile, when the terminal operates according to the current standard regulation, the terminal may operate as follows in association with the secondary cell.

1. Events A1 and A2

1) The terminal regards the secondary cell as the serving cell.

2) That is, the secondary cell regarded as the serving cell is regarded to be applicable in evaluating events A1 and A2.

3) If the secondary cell satisfies events A1 and A2, the terminal makes the secondary cell be included in the 'cellsTriggeredList'.

4) However, since the secondary cell is regarded as the serving cell, there is no applicable neighboring cell which needs to be reported in the 'cellsTriggeredList', and as a result, the terminal does not constitute the 'measResultNeighCells'. That is, the 'measResultNeighCells' is not included in the measurement report. The terminal transmits the measurement report including only the 'measResultPCel' and the 'measResultServFreqList'.

2. Event A3.

1) The terminal regards the secondary cell as the neighboring cell.

2) That is, the secondary is regarded to be applicable in evaluating event A3.

3) If the secondary cell satisfies event A3, the terminal makes the secondary cell be included in the 'cellsTriggeredList'.

4) The 'cellsTriggeredList' including the secondary cell is included in the 'measResultNeighCells' of the measurement report. The terminal transmits the measurement report including the 'measResultPCel', the 'measResultServFreqList', and the 'measResultNeighCells'.

3. Event 4.

1) The terminal regards the secondary cell as the serving cell.

2) That is, the secondary is regarded to be applicable in evaluating event A4.

3) Therefore, the secondary cell does not trigger the measurement report by satisfaction of event A4.

4) There is no measurement report triggered by the secondary cell.

4. Event A5.

1) The terminal regards the secondary cell as the neighboring cell.

2) The secondary is regarded to be applicable in evaluating event A5.

3) If the secondary cell satisfies event A5, the terminal makes the secondary cell be included in the 'cellsTriggeredList'.

4) The 'cellsTriggeredList' including the secondary cell is included in the 'measResultNeighCells' of the measurement report. The terminal transmits the measurement report including the 'measResultPCel', the 'measResultServFreqList', and the 'measResultNeighCells'.

5. Event A6.

1) The terminal regards the secondary cell as the serving cell.

2) The secondary is regarded to be applicable in evaluating event A6.

3) Therefore, the secondary cell does not trigger event A6 and the second cell may not be included in the 'cellsTriggeredList'. As a result, the second cell may not be included in the 'measResultNeighCells'.

4) There is no measurement report triggered by the secondary cell.

As described, in the current standard, the measurement report follows whether to trigger (satisfy) the event and whether the secondary cell is included in the 'measResultNeighCells' varies depending on whether the secondary cell being regarded as the serving cell or the neighboring cell. Therefore, when the network is implemented in such a manner to refer to contents of the 'measResultNeighCells' for radio resource management (RRM), the ambiguity may occur.

Figure 14:
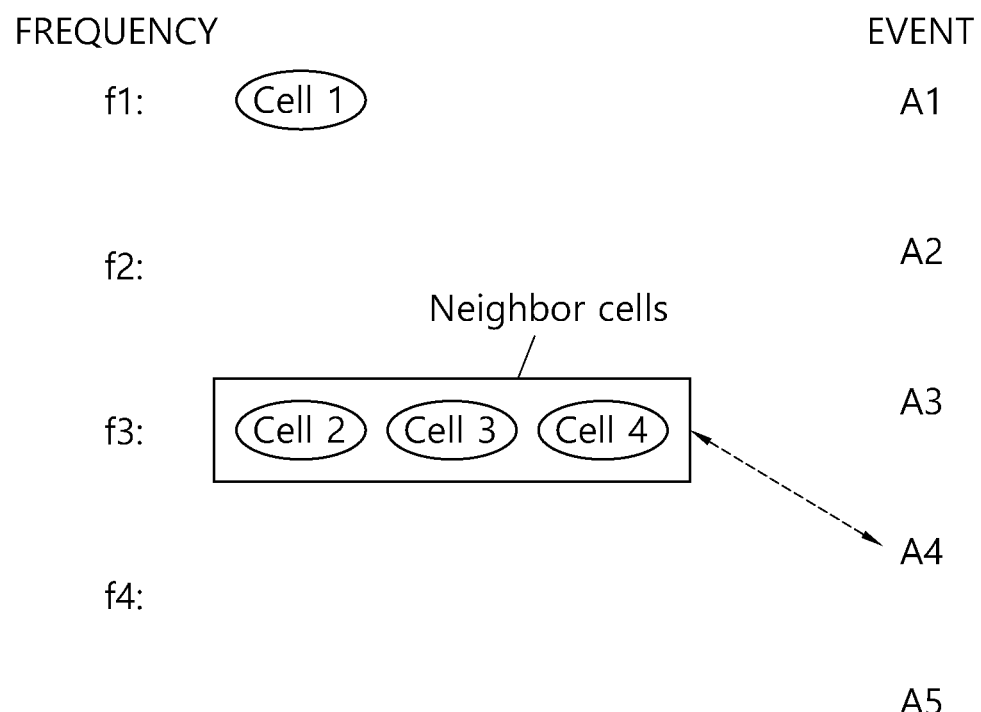
FIG. 14 illustrates a case in which the secondary cell is included in the 'measResultNeighCells'.

FIG. 14 illustrates a case in which the secondary cell is included in the 'measResultNeighCells'.

Referring to FIG. 14, cell 1 of an f1 frequency band may be configured as the primary cell for the terminal. In addition, it is assumed that cells 2, 3, and 4 in an f3 frequency band are configured as measurement target neighboring cells by a measurement configuration message. That is, it is assumed that cells 2, 3, and 4 are applicable cells with respect to event A4.

When event A4 is satisfied with respect to cell 2, the terminal makes cell 2 be included in the 'cellsTriggeredList'. Then, since the 'cellsTriggeredList' is not empty and cell 2 as the neighboring cell is present, the cells included in the 'cellsTriggeredList' are transmitted while being included in the 'measResultNeighCells'.

Meanwhile, the terminal transmits the 'measResultNeighCells' and thereafter, cell 2 may be added as the secondary cell for the terminal. According to the conventional standard, when cell 2 as the neighboring cell is added as the secondary cell, how to modify the 'cellsTriggeredList' is not prescribed. Further, according to the conventional standard, when the 'cellsTriggeredList' is not empty, the cells included in the 'cellsTriggeredList' are transmitted while being included in the 'measResultNeighCells'. Although cell 2 is added as the secondary cell, and as a result, cell 2 is not the neighboring cell any longer, cell 2 is included in the therefore, there is a problem in that the terminal makes cell 2 be included in the 'measResultNeighCells' and transmits cell 2 included in the 'measResultNeighCells' again. This causes unnecessary power waste of the terminal and the ambiguity in radio resource management of the base station.

Hereinafter, application examples capable of the problem will be described. The following examples may be applied to the conventional operations of the terminal, which include "1. Events A1 and A2" to "5. Event A6" described above through addition/modification.

The terminal may follow the aforementioned conventional operations while only one cell, for example, the primary cell is configured and operate as described in Application Example 1 or 2 given below when the secondary cell is added. That is, while only the primary cell is configured for the terminal that supports the carrier aggregation, when other cells except for the primary cell are added as the secondary cell of the terminal, Application Example 1 or 2 may be applied as below.

[Application Example 1].

The terminal may regard the secondary cell as the serving cell with respect to a specific event. In this case, the secondary cell may be regarded as an unapplicable cell in evaluating the specific event.

For example, while only the primary cell is configured, cell 2 as the neighboring cell satisfies the specific event, and as a result, the terminal may transmit the measurement report. In this case, the terminal may follow the conventional operations.

When cell 2 is added as the secondary cell, the terminal then regards cell 2 as the serving cell with respect to the specific event and regards cell 2 to be unapplicable in evaluating the event. If the applicable cell of the specific event is the neighboring cell, cell 2 is now regarded as the unapplicable cell with respect to the specific event.

The terminal determines whether cell 2 added as the secondary cell is applicable to related measurement. In the above example, since cell 2 added as the secondary cell is not applicable to the specific event, the terminal removes cell 2 as the secondary cell from the 'cellsTriggeredList'.

When entries are not empty in the 'cellsTriggeredList' removed with the secondary cell, the 'cellsTriggeredList' removed with the secondary cell is included in the 'measResultNeighCells'. When the entries of the 'cellsTriggeredList' removed with the secondary cell is empty, the terminal does not make the 'measResultNeighCells' be included in the measurement report message. When the entries of the 'cellsTriggeredList' removed with the secondary cell is empty, that is, the 'cellsTriggeredList' is empty, the terminal may stop subsequent measurement report transmission associated with the related measurement.

The terminal transmits the measurement report message including the 'measResultPCel', the 'measResultServFreqList', and the 'measResultNeighCells'.

[Application Example 2].

The terminal may regard the secondary cell as the neighboring cell with respect to a specific event. The secondary cell may be regarded to be applicable cell in evaluating the specific event.

When the secondary cell triggers the specific event, the terminal makes the secondary cell be included in the 'cellsTriggeredList'.

When the 'cellsTriggeredList' is included in the 'measResultNeighCells' of the measurement report message, the terminal excludes the secondary cell. The terminal transmits the measurement report including the 'measResultPCel', the 'measResultServFreqList', and the 'measResultNeighCells' (when not empty). In this case, a different from Application Example 1 is that the secondary cell is regarded as the neighboring cell in evaluating the specific event, but the secondary cell may be regarded as the serving cell in constituting a field to be included in the measurement report message. Therefore, the secondary cell may be excluded from the field constituting the measurement report message.

Application Example 1 will be described in more detail with reference to FIGS. 15 and 16.

Figure 15:
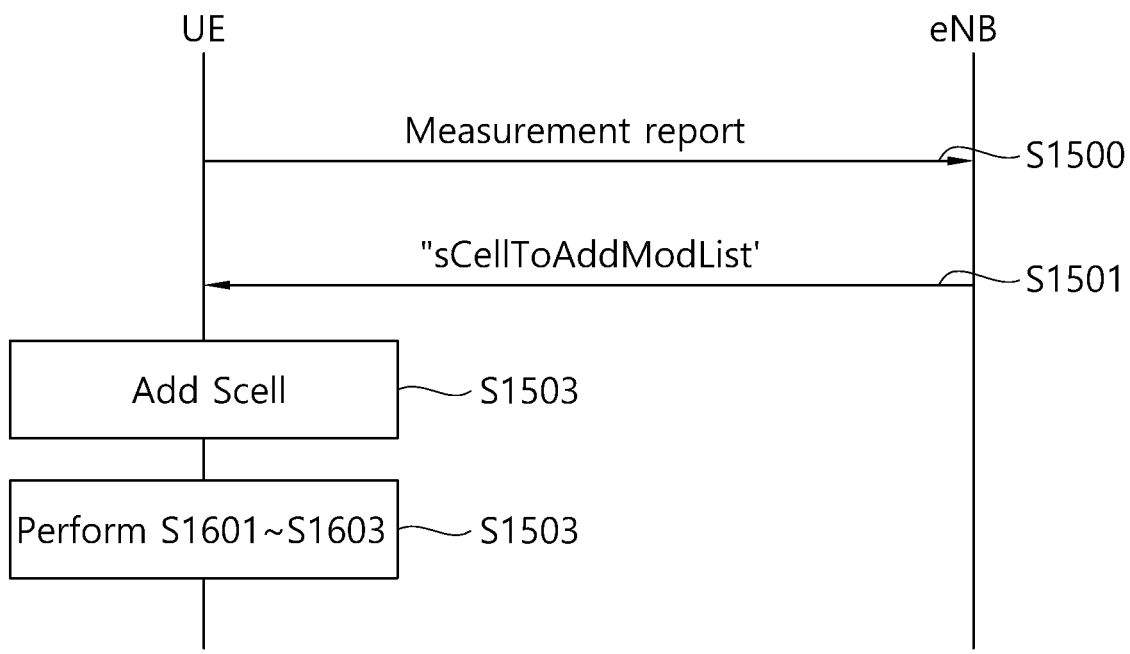
FIG. 15 is an operating method of the terminal supporting carrier aggregation.

FIG. 15 is an operating method of the terminal supporting carrier aggregation.

Referring to FIG. 15, the terminal performs a measurement report to the base station (S1500). In the measurement report, when cell 2 as a neighboring cell satisfies event A4, cell 2 is included in 'cellsTriggeredList', and as a result, it is assumed that cell 2 is included in 'measResultNeighCells'. That is, it is assumed that the step is performed, in which cell 2 is included in the cell list triggered through satisfaction of a specific event.

The base station transmits configuration information 'sCellToAddModList' on the secondary cell to be added in the terminal with reference to the measurement report (S1501).

The terminal adds the secondary cell (S1502). The terminal may add the specific cell as the secondary cell based on the configuration information on the secondary cell. For example, it is assumed that cell 2 is added as the secondary cell. In this case, cell 2 as the secondary cell is regarded as a serving cell and the secondary cell is not applicable to the related measurement event A4.

For example, when cell 2 as the neighboring cell and event A4 are indicated by a measurement identity, event A4 becomes the related measurement with respect to cell 2. As described above, the reason is that the cell which is applicable to event A4 is the neighboring cell. However, when cell 2 is added to the terminal as the secondary cell to be the serving cell, cell 2 is not applicable to event 4 at all.

Figure 16:
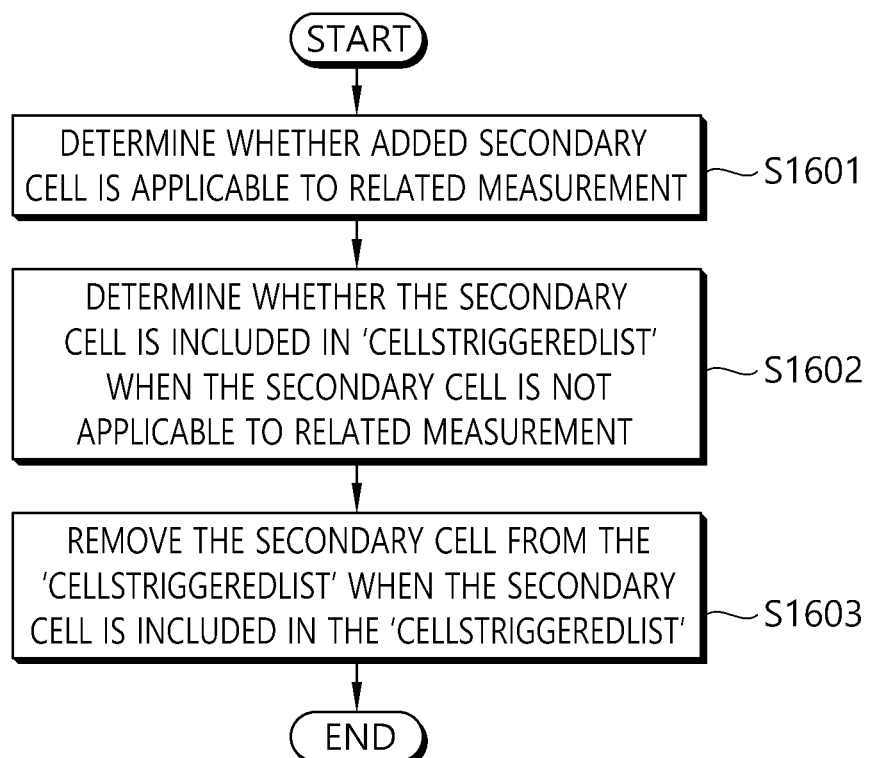
FIG. 16 describes S1601 to S1603 of FIG. 15.

The terminal performs S1601 to S1603 described in FIG. 16.

FIG. 16 describes S1601 to S1603 of FIG. 15.

Referring to FIG. 16, the terminal determines whether the secondary cell is applicable to the related measurement (S1601). In the example of FIG. 15, on the assumption that cell 2 is added to the secondary cell, if cell 2 is the neighboring cell and is related with event A4, the cell 2 is applicable to the related measurement. Meanwhile, if cell 2 is the serving cell and is related with event A4, the cell 2 is not applicable to the related measurement. According to Application Example 1, since cell 2 added as the secondary cell is regarded as the serving cell related with event A4, cell 2 is not applicable to the related measurement.

When the secondary cell is not applicable to the related measurement, the terminal determines whether the secondary cell is included in 'cellsTriggeredList' (S1602).

When the secondary cell is included in the 'cellsTriggeredList', the terminal removes the secondary cell from the 'cellsTriggeredList' (S1603).

That is, according to the present invention, the terminal excludes the secondary cell which is not applicable to the related measurement from the measurement report. To this end, the secondary cell which is not applicable to the related measurement is removed from the 'cellsTriggeredList'.

In the examples of FIGS. 15 and 16, in the state where only the primary cell is configured, according to the conventional terminal operation, cell 2 is regarded as the neighboring cell in evaluating specific event (e.g., A4) and included in the measurement report (S1500) to be transmitted to the base station. However, after cell 2 is added as the secondary cell, i) according to Application Example 1, cell 2 is regarded as the serving cell in evaluating the specific event, or ii) cell 2 is referred to as the serving cell when constituting a field to be included in a measurement report message according to Application Example 2.

As a result, cell 2 is removed from the field 'cellsTriggeredList' to be included in the measurement report message defined with respect to the specific event A4.

In Application Examples 1 and 2, the secondary cell was removed from the 'cellTriggeredList' under a specific condition. Accordingly, the secondary cell is excluded from the 'measResultNeighCells'. Hereinafter, Application Examples in which the secondary cell is necessarily included in the 'measResultNeighCells' will be described.

[Application Example 3]

The terminal may regard the secondary cell as the serving cell in evaluating a specific event and the secondary cell as the neighboring cell in constituting the field to be included in the measurement report.

That is, the secondary cell may be regarded to be applicable in evaluating specific events A1 and A2. When the secondary cell triggers the specific event, the terminal makes the secondary cell be included in the 'cellsTriggeredList'.

The 'cellsTriggeredList' including the secondary cell is included in the 'measResultNeighCells' of the measurement report. The terminal transmits the measurement report including the 'measResultPCell', the 'measResultSeryFreqList', and the 'measResultNeighCells'.

[Application Example 4]

The terminal regards the secondary cell as the serving cell with respect to a specific event. That is, the secondary cell may be regarded to be applicable in evaluating specific events A1 and A2. When the secondary cell triggers the specific event, the terminal makes the secondary cell be included in the 'cellsTriggeredList'. In this case, the secondary cell is included in the 'cellsTriggeredList' as the neighboring cell as well as the serving cell.

In respect to the specific event, the 'cellsTriggeredList' including the secondary cell as the neighboring as well as the serving cell is included in the 'measResultNeighCells' of the measurement report. In respect to other events except for the specific event, only neighboring cells of the 'cellsTriggeredList' are included in the 'measResultNeighCells'. The terminal transmits the measurement report including the 'measResultPCell', the 'measResultSeryFreqList', and the 'measResultNeighCells'.

Figure 17:
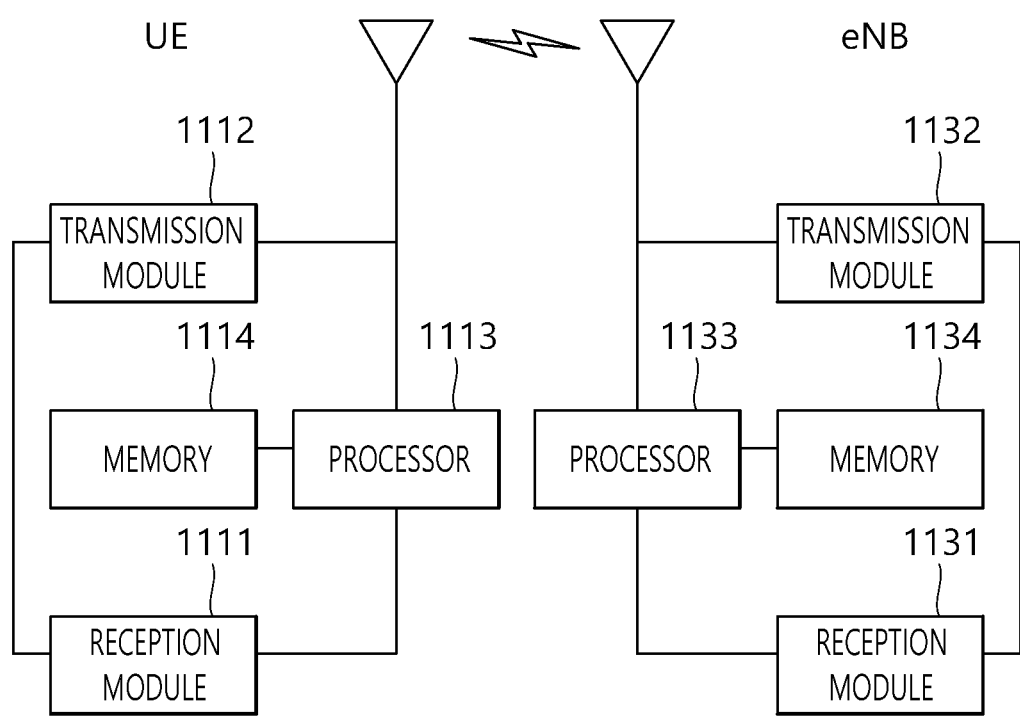
FIG. 17 is a diagram illustrating a configuration of an embodiment of a wireless communication system including a terminal apparatus and a base station apparatus according to the present invention.

FIG. 17 is a diagram illustrating a configuration of an embodiment of a wireless communication system including a terminal apparatus and a base station apparatus according to the present invention.

Referring to FIG. 17, each terminal (UE) apparatus may include a reception module 1111, a transmission module 1112, a processor 1113, and a memory 1114. The reception module 1111 may receive various signals, data, information, and the like from a base station, and the like. The transmission module 1112 may receive various signals, data, information, and the like to the base station, and the like. Further, the reception module 1111 may receive the measurement configuration information including the reference information described above. The processor 1113 adds a secondary cell and determines whether the secondary cell is applicable to related measurement. In addition, in determining whether the secondary cell is included in 'cellsTriggeredList', when the secondary cell is not applicable to the related measurement and the secondary cell is included in the 'cellsTriggeredList', the secondary cell is removed from the 'cellsTriggeredList'.

Meanwhile, the base station (eNB) apparatus may include a reception module 1131, a transmission module 1132, a processor 1133, and a memory 1134. The reception module 1131 may receive various signals, data, information, and the like from a terminal, and the like. The transmission module 1132 may receive various signals, data, information, and the like to the terminal, and the like.

The processor 1133 may transmit configuration information for the secondary cell through the transmission module 1132 and receive a measurement report message from the terminal through the reception module 1131. The processor 1133 may manage mobility of the concerned terminal through the measurement report message received from the terminal. Besides, the processor 1133 performs a function to operate information received by the terminal apparatus, information to be transmitted to the outside, and the like and the memory 1134 may store the operated information, and the like for a predetermined time and be substituted with a component such as a buffer (not illustrated), or the like.

The aforementioned embodiments and modifications can be implemented through various means. For example, the embodiments of the present invention can be implemented in hardware, firmware, software, combination of them, etc.

In case of the hardware implementation, the method according to the embodiments of the present invention can be implemented by one or more application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, or the like.

What is claimed is:

1. A method for a user equipment (UE), the method comprising:
    adding a secondary cell;
    triggering a measurement report based on a report type; and
    performing the measurement report,
    wherein based on the secondary cell not being applicable for an associated measurement, and based on the secondary cell being included in a triggered cell list, the UE removes the secondary cell from the triggered cell list,
    wherein based on the report type set to a triggered event and an entry condition applicable for an event being fulfilled for the secondary cell, and based on the secondary cell not being included in the triggered cell list, the UE includes the secondary cell in the triggered cell list, and
    wherein the event being fulfilled for the secondary cell is based on a result of one measurement among a plurality of measurements comprising a measurement applicable to a serving cell and a measurement applicable to a neighboring cell.

2. The method of claim 1, wherein whether the secondary cell is applicable for the associated measurement among the plurality of measurements is determined based on whether the secondary cell is a serving cell or a neighboring cell.

3. The method of claim 1, wherein the event is an event in which a channel state of a serving cell is better than a threshold.

4. The method of claim 1, wherein the triggered cell list comprises a physical cell identity of a cell.

5. The method of claim 1, wherein the UE is configured with a primary cell in which the UE performs an initial connection establishment procedure or a connection re-establishment procedure.

6. The method of claim 5, wherein the secondary cell is a cell providing additional radio resources in addition to the primary cell.

7. A user equipment (UE), the UE comprising:
    a transceiver; and
    a processor operably connectable to the transceiver,
    a memory operably connectable to the processor and storing instructions that, when executed by the processor, perform operations comprising:
    adding a secondary cell;
    triggering a measurement report based on a report type; and
    performing the measurement report,
    wherein based on the secondary cell not being applicable for an associated measurement, and based on the secondary cell being included in a triggered cell list, the UE removes the secondary cell from the triggered cell list,
    wherein based on the report type set to a triggered event and an entry condition applicable for an event being fulfilled for the secondary cell, and based on the secondary cell not being included in the triggered cell list, the UE includes the secondary cell in the triggered cell list, and
    wherein the event being fulfilled for the secondary cell is based on a result of one measurement among a plurality of measurements comprising a measurement applicable to a serving cell and a measurement applicable to a neighboring cell.

8. The UE of claim 7, wherein whether the secondary cell is applicable for the associated measurement among the plurality of measurements is determined based on whether the secondary cell is a serving cell or a neighboring cell.

9. The UE of claim 7, wherein the event is an event in which a channel state of a serving cell is better than a threshold.

10. The UE of claim 7, wherein the triggered cell list comprises a physical cell identity of a cell.

11. The UE of claim 7, wherein the UE is configured with a primary cell in which the UE performs an initial connection establishment procedure or a connection re-establishment procedure.

12. The UE of claim 11, wherein the secondary cell is a cell providing additional radio resources in addition to the primary cell.

13. An apparatus, the apparatus comprising:
    a processor; and
    a memory operably connectable to the processor and storing instructions that, when executed by the processor, perform operations comprising:

adding a secondary cell;

triggering a measurement report based on a report type; and performing reporting the measurement report, wherein based on the secondary cell not being applicable for an associated measurement, and based on the secondary cell being included in a triggered cell list, the secondary cell is removed from the triggered cell list, wherein based on the report type set to a triggered event and an entry condition applicable for an event being fulfilled for the secondary cell, and based on the secondary cell not being included in the triggered cell list, the secondary cell is included in the triggered cell list, and wherein the event being fulfilled for the secondary cell is based on a result of one measurement among a plurality of measurements comprising a measurement applicable to a serving cell and a measurement applicable to a neighboring cell.

14. The apparatus of claim 13, wherein whether the secondary cell is applicable for the associated measurement among the plurality of measurements is determined based on whether the secondary cell is a serving cell or a neighboring cell.

15. The apparatus of claim 13, wherein the event is an event in which a channel state of a serving cell is better than a threshold.

16. The apparatus of claim 13, wherein the triggered cell list comprises a physical cell identity of a cell.

17. The apparatus of claim 13, wherein the apparatus is configured with a primary cell in which the apparatus performs an initial connection establishment procedure or a connection re-establishment procedure, and wherein the secondary cell is a cell providing additional radio resources in addition to the primary cell.

* * * * *